(No Model.)
J. G. MOOMY.
APPARATUS FOR REPAIRING PNEUMATIC TIRES.
No. 567,402. Patented Sept. 8, 1896.
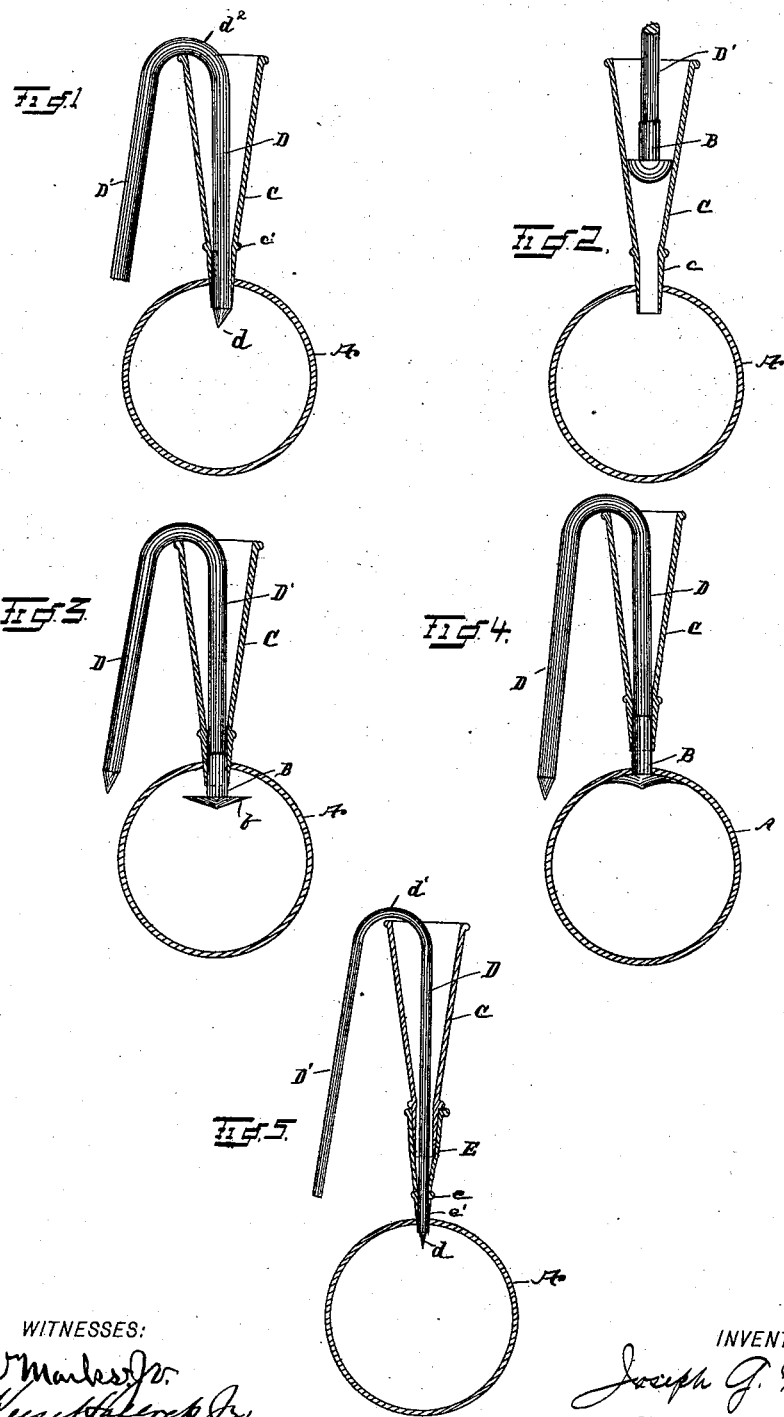
WITNESSES:
INVENTOR
ATTORNEYS

UNITED STATES PATENT OFFICE.

JOSEPH G. MOOMY, OF ERIE, PENNSYLVANIA.

APPARATUS FOR REPAIRING PNEUMATIC TIRES.

SPECIFICATION forming part of Letters Patent No. 567,402, dated September 8, 1896.

Application filed March 25, 1896. Serial No. 584,805. (No model.)

*To all whom it may concern:*

Be it known that I, JOSEPH G. MOOMY, a citizen of the United States, residing at Erie, in the county of Erie and State of Pennsylvania, have invented certain new and useful Improvements in Apparatus for Repairing Pneumatic Tires; and I do hereby declare the following to be a full, clear, and exact description of the invention, such as will enable others skilled in the art to which it appertains to make and use the same.

This invention relates to repairing apparatus for pneumatic tires; and it consists in certain improvements in the construction thereof, as will be hereinafter fully described, and pointed out in the claims.

The object of the invention is to provide an efficient means of inserting into a tubular tire a patch or plug for the purpose of closing a puncture or repairing a defect in the tire.

The invention is illustrated in the accompanying drawings, as follows:

Figure 1 shows a cross-section of a tire with my repair apparatus shown in section and inserted therein. Fig. 2 is a similar view with the awl-pin removed and a plug started. Fig. 3 is a similar view with the plug through the insertion-funnel. Fig. 4 is a similar view with the funnel drawn out of the tire. Fig. 5 shows the funnel with a small-sized thimble extension.

A marks the tire; B, the plug; C, an insertion-funnel; D, an awl-pin; D', a push-pin.

The funnel has a flaring inner surface terminating in the extension $c$, which is substantially cylindrical in form—*i. e.*, the elements of its surface are substantially parallel; or, in other words, the funnel beginning at the inner end extends outwardly some distance at a substantially uniform diameter and then with a gradually increasing diameter flares toward the outer end. The cylindrical part, or that part at the inner end of substantially uniform diameter, I term "the contracted mouth" of the funnel.

The awl-pin D has an awl-point $d'$ and a stop, as the crook $d^2$, which adjusts the awl-pin longitudinally, so that the awl-point is wholly within the funnel, but preferably not further exposed.

The outer surface of the funnel at the upper end of the cylindrical part, the termination of the contracted mouth, is provided with the stop-shoulder $c'$, which so limits the extent of insertion as to prevent a puncture by the awl-point in the opposite wall of the tire.

The push-pin D' is preferably provided with a blunt end, its purpose being to push the plug through the funnel. Its inward movement is limited by the stop-crook $d^2$, so as to push the plug through the funnel just far enough to allow the head $b$ of the plug to clear the funnel. In accomplishing this the end of the push-pin is preferably limited to just enter the contracted mouth. There should be in any event a space between the inner end of the funnel and the end of the push-pin at its inmost position some greater in depth than the thickness of the tire upon which it is designed to operate, in order that there may always be a portion of the stem above the surface of the tire when the funnel is removed, so that the plug may be drawn by means of the protruding stem to place. To explain more fully, if the push-pin should be made to reach so nearly the inner end of the funnel that the length of plug-stem retained by the contracted mouth were less than the thickness of the tire, the wall of the tire around the opening, by reason of an adhesive quality greater than that of the funnel, would engage the plug-stem just as the inner end of the funnel had passed the inner surface of the tire and would hold the plug so engaged as the funnel was pulled out over it, and the length of plug in the end of the funnel being less than the thickness of the tire-wall, it will readily be seen that the outer end of the stem would not come out flush with the outer surface of the tire, and consequently would not come to a position in which the plug might be grasped and drawn to place. Where a greater length of stem is retained in the contracted mouth, there may be sufficient adhesion in the funnel itself to draw the plug to place; but to guard against unsuccessful operations with plugs of different sizes relatively to the contracted mouth it is desirable to retain a sufficient length of plug-stem within the end of the funnel, so that even if the action of the walls of the tire at the opening should retain the plug at its first exposure at the inner edge of the opening there would still be, by reason of the length of stem in the funnel, a portion of the stem above the surface of the tire at the completion of the withdrawal of the funnel. Tires vary in thickness; but the ordinary commercial sizes run from approximately one-eighth of an inch to a considerably greater thickness. The least practical projection of stem from the tire-surface after the removal of the funnel is not less than one-sixteenth of an inch, and even with this length it is difficult to get sufficient hold of the stem to draw the plug out to place, so that it is desirable to have a greater projection. To operate, therefore, upon the principle that my device is intended to act, the length of plug-stem retained in the funnel should be at least a sixteenth of an inch greater than the thickness of the tire upon which it is designed to operate; and to accomplish this the push-pin should be limited in its inward movement to at least the thickness of the tire and one-sixteenth of an inch from the inner end of the funnel, which distance may be specifically expressed as at least three-sixteenths of an inch. Preferably, however, the inward movement of the push-pin should be limited to make its inmost position more than three-sixteenths of an inch from the inner end of the funnel, in order that there may be under all conditions a greater protrusion of plug-stem after the removal of the funnel. The essential features of this part of the invention may be briefly stated to be a funnel arranged to engage a plug protruding from its inner end and a push-pin arranged to operate against the plug-stem at its outer end, and so limited in its inward movement as to allow the retention in the inner end of the funnel a plug-stem of sufficient length to at least extend through the tire-wall a gripping distance outside, which length of plug-stem may be specifically expressed as three-sixteenths of an inch or more.

The operation of the device will be readily understood.

The funnel with the awl-pin is pushed through the puncture, as shown in Fig. 1. The awl-pin is drawn out and a plug inserted, as shown in Fig. 2. The plug is pushed through the funnel by means of the push-pin D', as shown in Figs. 2 and 3. The funnel is then drawn out, as shown in Fig. 4. The plug is drawn up against the wall of the tire by means of its projecting end. Of course it will be understood that the awl-point, plug, and inner surface of the funnel are to be liberally coated with cement. After the cement dries the projecting end of the plug is cut off, as is now usual.

By bending the awl-pin as shown, the push-pin forms a handle while the awl-pin is in use and the awl-pin forms a handle for the push-pin when it is in use. The bend also makes the stop for positioning the awl-pin with the funnel and for limiting the inward movement of the push-pin at the proper point, as above described.

By making the inner end of the funnel-opening of substantially cylindrical shape— *i. e.*, forming a contracted mouth of substantially uniform diameter—it presents a longer surface to engage the plug-stem than would be the case where the flaring surface continued to the inner opening. This insures the holding of the neck of the plug by the contracted mouth, so that as the funnel is drawn out the head of the plug is or can be drawn up closely against the inner wall of the tire. Furthermore, if the funnel should spread from the inner edge it would, when pushed through sufficiently far for convenient manipulation, make an opening in the tire considerably larger than the inner opening. With applicant's device the opening in the tire is as nearly the size of the inner opening as a proper thickness of metal will allow, so that in consequence the opening in the tire is as small as the size of the plug will allow.

In Fig. 5 I have shown a thimble E, having a smaller cylindrical part or contracted mouth e'. It is provided with a stop-shoulder e, and the awl-pin D and push-pin D' are lengthened to adapt them to the increased length of the funnel. The purpose of this thimble is to allow the insertion of smaller plugs than would be practical with the larger opening.

My device is also applicable to inserting patches instead of plugs. This is especially true when the puncture extends through both walls of the tire. In this case the patch for the opposite puncture may also be inserted through the funnel. This often allows a repair without a removal of the tire from the rim where it otherwise would be necessary.

What I claim as new is—

1. In a tire-repairing apparatus, the combination of a funnel having a contracted mouth of substantially uniform diameter extending outwardly from the inner end and an outer part leading from said contracted mouth with a gradually-increasing diameter; and a push-pin for forcing plugs from said outer portion into and partly through said contracted mouth for the purposes set forth.

2. A funnel for repairing pneumatic tires, said funnel being formed with a flaring inner surface at its outer end and with a contracted mouth at its inner end leading from the flaring outer part and with a substantially uniform diameter and having a stop-shoulder on the outer surface of said contracted mouth for the purposes set forth.

3. In a tire-repairing apparatus, the combination of a funnel having an outer flaring part leading into an inner part arranged to engage a plug inserted from the flaring outer part and to retain the plug in an inwardly-protruding position; and a push-pin arranged to operate upon a plug-stem at its outer end for forcing a plug from said flaring part into and partially through said engaging inner part, said push-pin being provided with a stop for limiting its inward movement to three-sixteenths of an inch or more from the inner end of the funnel for the purposes set forth.

4. In combination with an insertion-funnel having a flaring inner surface at its outer end merging into a contracted mouth at the inner end, said contracted mouth extending through the inner end with a substantially uniform diameter throughout its length; a thimble placed on the contracted mouth and having a contracted mouth similar in form to that of the funnel but of smaller diameter for the purposes set forth.

In testimony whereof I affix my signature in presence of two witnesses.

JOSEPH G. MOOMY.

Witnesses:
L. E. TORRY,
MARTIN MAUER.